United States Patent
Komatsu et al.

(10) Patent No.: US 12,529,804 B2
(45) Date of Patent: Jan. 20, 2026

(54) RADIATION DETECTION APPARATUS AND RADIATION IMAGING SYSTEM

(71) Applicant: CANON KABUSHIKI KAISHA, Tokyo (JP)

(72) Inventors: Tomoki Komatsu, Kanagawa (JP); Yohei Ishida, Kanagawa (JP); Tamaki Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 18/497,292

(22) Filed: Oct. 30, 2023

(65) Prior Publication Data
US 2024/0159922 A1    May 16, 2024

(30) Foreign Application Priority Data
Nov. 10, 2022   (JP) .................................. 2022-180538

(51) Int. Cl.
*G01T 1/202*    (2006.01)

(52) U.S. Cl.
CPC .................................. *G01T 1/202* (2013.01)

(58) Field of Classification Search
CPC ......... G01T 1/202; G01T 1/20; H10F 39/806; H10F 39/1898; H10F 39/024
See application file for complete search history.

(56) References Cited

U.S. PATENT DOCUMENTS

| | | | |
|---|---|---|---|
| 7,692,156 B1 * | 4/2010 | Nagarkar | G01T 1/1644 250/361 R |
| 8,648,311 B2 | 2/2014 | Kobayashi | |
| 8,648,312 B2 | 2/2014 | Ichimura | |
| 8,653,465 B2 | 2/2014 | Nagano | |
| 8,704,185 B2 | 4/2014 | Ishida | |
| 8,957,383 B2 | 2/2015 | Sasaki | |
| 9,000,387 B2 * | 4/2015 | Bernhardt | G21K 4/00 250/361 R |
| 9,006,665 B2 | 4/2015 | Nagano | |

(Continued)

FOREIGN PATENT DOCUMENTS

| | | | | |
|---|---|---|---|---|
| JP | 2009236704 A | * | 10/2009 | |
| JP | 2012107960 A | * | 6/2012 | ............. G01T 1/202 |

OTHER PUBLICATIONS

U.S. Appl. No. 18/473,963, Daiki Nakagawa, filed Sep. 25, 2023.

*Primary Examiner* — Edwin C Gunberg
*Assistant Examiner* — Richard O Toohey
(74) *Attorney, Agent, or Firm* — VENABLE LLP (57) ABSTRACT

A radiation detection apparatus comprises a rectangular sensor panel having a pixel array including a plurality of photoelectric conversion elements, and a scintillator layer on which a plurality of columnar crystals configured to convert radiation into light are arranged. The scintillator layer has one side along an outer shape of the sensor panel and an opposite side of the one side and a region between the one side and the opposite side in which directions in which columnar crystals extend and a normal line of a main surface of the sensor panel form angles. The angles have a concentric angle distribution decreasing in angle from a central portion of the one side toward the opposite side, and thicknesses of the plurality of columnar crystals have a concentric thickness distribution increasing in thickness from the central portion of the one side to the opposite side.

9 Claims, 5 Drawing Sheets

(56) References Cited

U.S. PATENT DOCUMENTS

| | | |
|---|---|---|
| 9,054,012 B2 | 6/2015 | Nomura |
| 9,234,271 B2 | 1/2016 | Nomura |
| 9,568,614 B2 | 2/2017 | Ishida |
| 9,971,043 B2 | 5/2018 | Ishida |
| 11,280,919 B2 | 3/2022 | Takenaka |
| 2012/0223239 A1* | 9/2012 | Bernhardt ................ G21K 4/00 250/366 |

* cited by examiner

RADIATION DETECTION APPARATUS AND RADIATION IMAGING SYSTEM

BACKGROUND OF THE INVENTION

Field of the Invention

The present invention relates to a radiation detection apparatus and a radiation imaging system.

Description of the Related Art

There is available a radiation detection apparatus that forms a scintillator layer by vacuum-depositing an alkali halide material such as thallium doped cesium iodide (CsI: Tl) on a sensor panel. Radiation detection apparatuses are required to uniform the resolutions of captured radiation images. Japanese Patent Laid-Open No. 2009-236704 discloses a radiation detection apparatus designed to improve a deterioration in resolution due to the incident angle of radiation by tilting columnar crystals in accordance with the incident angle of radiation.

However, the columnar crystals formed in a vacuum deposition process sometimes have a thickness distribution within a plane of the radiation detection apparatus. The thickness distribution may make the resolution within a plane of the radiation detection apparatus ununiform and hence may make the resolution in a plane of a captured radiation image ununiform.

SUMMARY OF THE INVENTION

One disclosed embodiment has been made in consideration of the above-described problem and can provide a radiation detection apparatus having a structure advantageous to uniform the resolution within a plane of a radiation image.

According to one aspect of the disclosure, there is provided a radiation detection apparatus. The radiation detection apparatus comprises a rectangular sensor panel having a pixel array including a plurality of photoelectric conversion elements; and a scintillator layer on which a plurality of columnar crystals configured to convert radiation into light are arranged so as to cover the sensor panel, wherein the scintillator layer has one side along an outer shape of the rectangular sensor panel and an opposite side of the one side and a region between the one side and the opposite side in which directions in which columnar crystals extend and a normal line of a main surface of the sensor panel form angles, and the angles have a concentric angle distribution decreasing in angle from a central portion of the one side toward the opposite side, and thicknesses of the plurality of columnar crystals have a concentric thickness distribution increasing in thickness from the central portion of the one side to the opposite side.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1A:
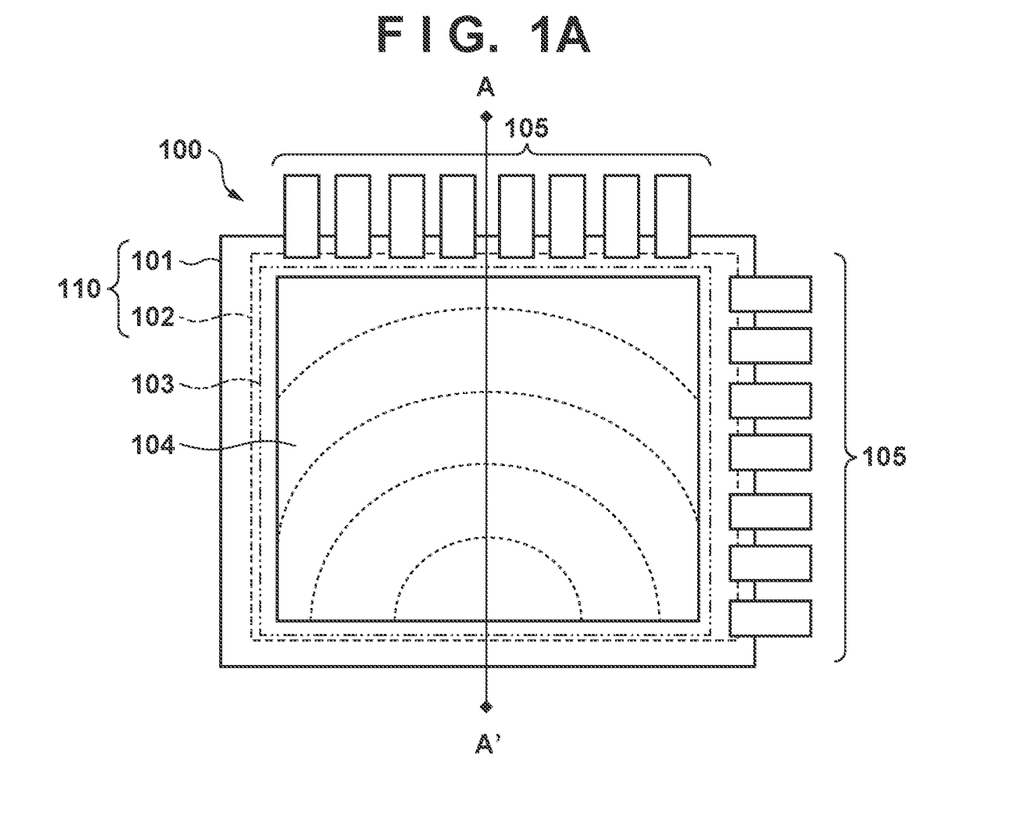
FIGS. 1A and 1B are views showing an example of the arrangement of a radiation detection apparatus.
Figure 1B:
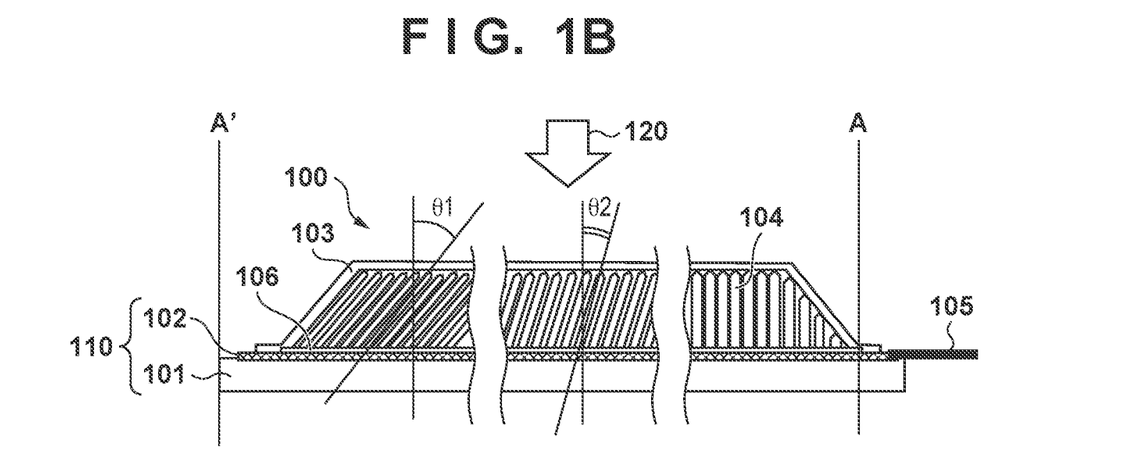

A radiation detection apparatus 100 according to an embodiment of the present invention will be described with reference to FIGS. 1A and 1B. FIG. 1A is a plan view of the radiation detection apparatus 100 viewed from the incident direction of radiation 120. FIG. 1B is a sectional view of the radiation detection apparatus 100 taken along line A-A' in FIG. 1A. The radiation detection apparatus 100 includes a sensor panel 110 provided with a substrate 101 and an imaging unit 102 having a pixel array in which a plurality of pixels including a plurality of photoelectric conversion elements are arranged.

The imaging unit 102 is protected by being covered with a sensor protection film 106 such as a resin film. The sensor protection film 106 is formed by using a material that is advantageous to protect the imaging unit 102 and has light transparency. A scintillator layer 104 is formed on one surface of the sensor panel 110. The scintillator layer 104 converts incident radiation into an electromagnetic wave that can be detected by the imaging unit 102. The scintillator layer 104 converts radiation into light if the imaging unit 102 has photoelectric conversion elements. The light converted by the scintillator layer 104 is transmitted through the sensor protection film 106 and enters the imaging unit 102. Examples of typical materials forming the sensor protection film 106 include silicone-based resins, polyimide-based resins, polyamide-based resins, epoxy-based resins, and resins containing organic materials such as paraxylene and acrylic.

A wiring unit 105 is connected to the imaging unit 102. A plurality of wiring units 105 may be provided. The wiring unit 105 is connected to an end portion of the sensor panel 110. Chip On Film (COF) can be used for the wiring unit 105. Note that in the present invention, the wiring unit 105 is not limited to COF, and other flexible wiring schemes such as Flexible Print Circuit (FPC) and Tape Automated Bonding (TAB) may be used.

The wiring unit 105 can be connected to a circuit board (not shown). Captured signals and control signals can be transmitted between the sensor panel and the circuit board via the wiring unit 105. The circuit board may be included in the radiation detection apparatus. The scintillator layer 104 has a plurality of columnar crystals covering the sensor panel. The surface of the scintillator layer 104 is protected by a scintillator protection film 103. The scintillator protection film 103 has a function of protecting the scintillator layer from moisture and the like. The scintillator protection film 103 may be formed by using a material that is advantageous to protect the scintillator layer 104 from deliquescence and has light reflectivity. Using a material having light reflectivity for the scintillator protection film 103 can reflect light, of the light generated by the scintillator layer 104, which propagates to the opposite side to the imaging unit 102 toward the imaging unit 102.

A typical example of the scintillator protection film 103 is the film formed by bonding a resin film to a thin metal film made of Ag, Cu, Au, Al, Ni, or the like. In this case, the resin to be used is, for example, polyethylene terephthalate, polycarbonate, vinyl chloride, polyethylene naphthalate, polyimide, or acrylic. The scintillator protection film 103 is formed by lamination so as to cover the upper and side surfaces of the scintillator layer 104. The scintillator protection film 103 further includes a bonding layer. This bonding layer is formed by using, for example, a hot melt resin such as a polyimide-based, epoxy-based, polyolefin-based, polyester-based, polyurethane-based, or polyamide-based resin. The scintillator protection film 103 is fixed by this bonding layer by pressure-bonding at the respective end portions.

The photoelectric conversion elements provided in the imaging unit 102 may be amorphous silicon elements or Complementary Metal Oxide Semiconductor (CMOS) elements. Photoelectric conversion elements may be provided on one surface of the substrate 101. In this case, when the radiation 120 enters, the scintillator layer 104 converts the radiation 120 into light that can be detected by the imaging unit 102, and the imaging unit 102 converts the light into an electrical signal.

The imaging unit 102 can include, on the substrate 101, photoelectric conversion elements arranged in a matrix pattern so as to form a plurality of rows and a plurality of columns and switch elements that output the charge signals obtained by the photoelectric conversion elements. As the photoelectric conversion elements, PIN type sensors can be used in this embodiment. Note that in the present invention, the photoelectric conversion elements are not limited to the PIN type sensors, and, for example, sensors such as Metal Insulator Semiconductor (MIS) type sensors may be used. In addition, each photoelectric conversion element may be formed by using a Charge Coupled Device (CCD)/CMOS image sensor chip.

The scintillator layer 104 includes a plurality of columnar crystals. Examples of materials that can be used for columnar crystals include CsI:Tl, CsI:Na, CsBr:Tl, NaI:Tl, LiI:Eu, and KI:Tl. A vapor deposition method is generally used to form columnar crystals. Radiation detection apparatuses having different scintillator layer shapes will be described below.

Example 1 of Scintillator Layer

A scintillator layer according to an embodiment of the present invention will be described first with reference to FIGS. 1A and 1B. As shown in FIG. 1A, the scintillator layer 104 covers the sensor panel 110 having a rectangular shape. The directions in which the plurality of columnar crystals forming the scintillator layer 104 respectively extend can have a region tilted with respect to the normal direction of the main surface (for example, the surface on which the scintillator layer is formed) of the sensor panel 110. The tilt angles can have a concentric distribution expanding from a central portion A' of one side of the scintillator layer 104 toward an opposite side of one side of the sensor panel 110. More specifically, as shown in FIG. 1B, the tilt angles are maximized at the central portion A' of the concentric circles, whereas as positions separate from the central portion A' and approach an outer circumferential portion of the concentric circles, for example, a portion A, the tilt angles gradually approach the normal direction of the sensor panel 110. In addition, the thicknesses of the columnar crystals also have a concentric distribution expanding from the central portion A' of one side toward the opposite side, and the thicknesses are minimized at the position nearest to the central portion A'. As positions separate from the central portion A' and approach the portion A, the thicknesses can gradually increase.

The light converted from the radiation 120 by the columnar crystals propagates in the crystals while being reflected and hence enters the imaging unit 102 with shifts corresponding to the thicknesses of the columnar crystals. In a region in which the columnar crystals are thin, a radiation image can have a high resolution, whereas in a region in which the columnar crystals are thick, a radiation image can have a low resolution. For this reason, a resolution distribution can occur in accordance with the thickness distribution. In this embodiment, however, the tilt angles of the columnar crystals have an angle distribution corresponding to the thickness distribution. The light emitted by the columnar crystals enters the imaging unit 102 with shifts corresponding to the tilt angles of the columnar crystals near a region near the central portion A' where the columnar crystals are thin. Since the radiation is scattered along the columns in a tilted portion where the columnar crystals are thin, the light emitted by the scintillator enters pixels upon spreading more than in a portion without any tilt. The light generated in the columnar crystals having tilts and small thicknesses enters pixels while having a spread similar to that of the light generated in the columnar crystals having no tilt and large thicknesses. This makes scattering corresponding to the tilt angles of the columnar crystals cancel out the shifts corresponding to the thicknesses of the columnar crystals and hence uniforms the in-plane distribution of the resolutions of the radiation detection apparatus.

Figure 2A:
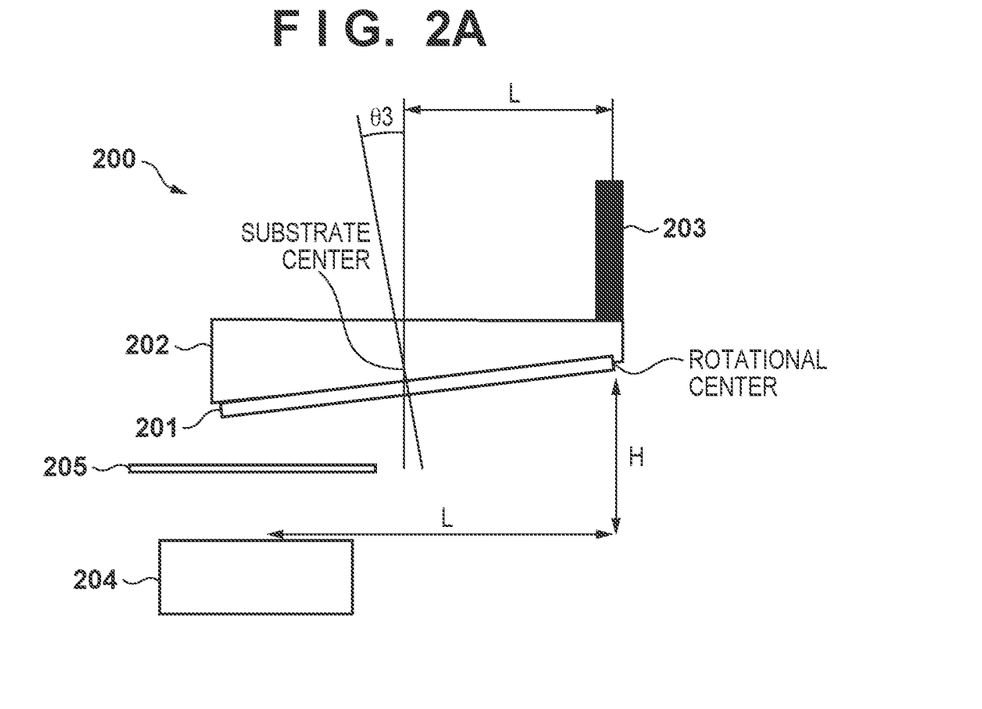
FIGS. 2A and 2B are views showing a forming method for a scintillator layer.
Figure 2B:
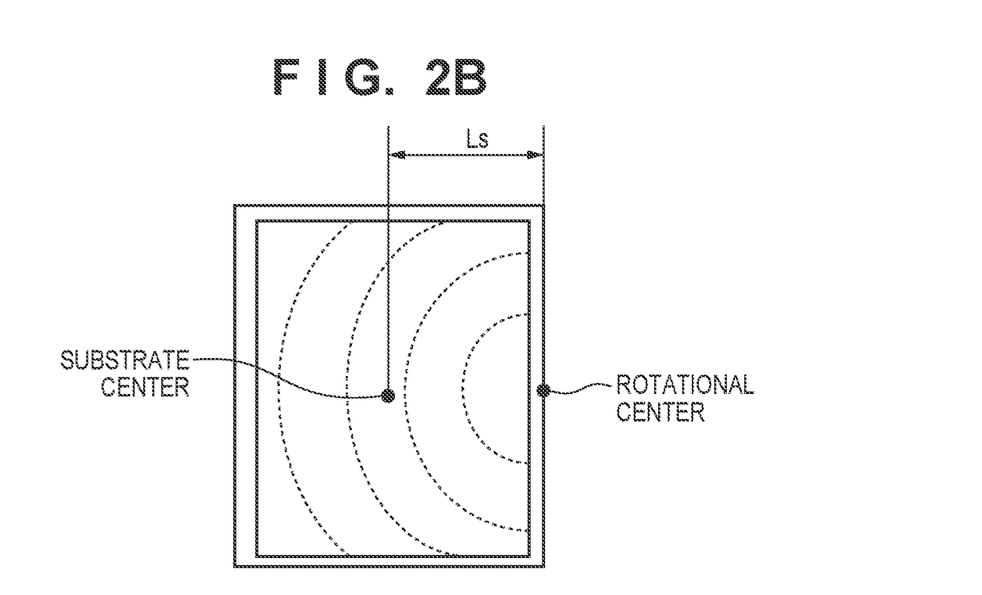

A method of manufacturing the radiation detection apparatus according to this example will be described next with reference to FIGS. 2A and 2B. A substrate 201 on which a scintillator layer is formed is prepared. A vapor deposition apparatus 200 used to form a scintillator layer includes a substrate holding mechanism 202 that holds the substrate 201, a rotating shaft 203, an evaporation source 204, and a shutter 205. The evaporation source 204 stores a material that forms a scintillator layer. The substrate 201 can have a PIN type photoelectric conversion element and a polyimide protection film (neither shown). The substrate 201 is held by the substrate holding mechanism 202 so as to be tilted at an angle θ3 with respect to the rotating plane of the rotating shaft 203. The substrate 201 rotates about the rotating shaft 203. At this time, the substrate is arranged such that the center of the rotating shaft 203 is located outside the center of one side of the substrate 201.

In this example, the rectangular substrate 201 having a length and a width of 460 mm and 390 mm and thickness t=0.5 mm was set such that a distance Ls between the rotating shaft 203 and the center of the substrate 201 and the angle θ3 were respectively set as Ls=195 mm and θ3=5°. The evaporation source 204 was installed such that a vertical distance H and a horizontal distance L from the rotational center were respectively 400 mm and 600 mm. At this time, the vertical distance H and the horizontal distance L are not limited to these values, and the vertical distance H may be set to 400 mm or less as long as the horizontal distance L of 600 mm or more can be ensured. This can prevent the distance between the evaporation source 204 and the substrate 201 from greatly increasing and hence can suppress the evaporation time and the amount of evaporation source material used and also suppress an increase in apparatus size.

Vapor deposition was performed as follows. First of all, after the evaporation source was filled with CsI:Tl as an evaporation source material, the vapor deposition apparatus 200 is evacuated to vacuum. After the vapor deposition apparatus 200 is evacuated to vacuum, the substrate 201 was rotated about the rotating shaft 203, and CsI:Tl was heated. When CsI:Tl was evaporated, the shutter 205 was opened, and CsI:Tl was deposited on the substrate 201 to form columnar crystals. When the film thickness reached 500 μm, the shutter 205 was closed to complete the vapor deposition. Thereafter, the scintillator was removed from the vapor deposition apparatus 200, and the shape of the scintillator was evaluated. Note that the film thickness is not limited to 500 μm.

The shape of a cross section of the scintillator layer taken along line A-A' was observed by using a Scanning Electron Microscope (SEM). A cross section can be obtained by cutting the scintillator layer along a straight line extending from the central portion of one side of a plane on the A' side to A on the opposite side, in a plane parallel to a normal line perpendicular to the substrate 101 of the sensor panel 110. The tilt angles formed by the directions in which the columnar crystals extend and the normal direction of the sensor panel 110 were respectively $\theta 1=4°$ at the position (A' side) nearest to the rotational center, $\theta 2=2°$ at a position of 250 mm from the rotational center, and 0° at the position farthest from the rotational center, that is, a position of 450 mm from the rotational center. In addition, the thicknesses were respectively $\phi 1=3$ μm at the point nearest to the rotational center, $\phi 2=3.8$ μm at a position of 250 mm from the rotational center, and $\phi 3=4.5$ μm at the position farthest from the rotational center, that is, a position of 450 mm from the rotational center. In thickness measurement, in this example, the thickness of each columnar crystal was measured at a position of 7% of the total length of the columnar crystal from the distal end of the columnar crystal in the direction in which the columnar crystal extends from the substrate 201, that is, a position of 35 μm. In the example, the average value of the thicknesses of 20 columnar crystals was set as a thickness at a predetermined position. In addition, as the tilt angle of each columnar crystal, the angle formed by a straight line connecting the lower end of the columnar crystal on the sensor panel side and the distal end on the opposite side and the normal direction of the sensor panel 110 was measured, and the average value of the measured tilt angles of 20 columnar crystals was used. In the example, the ratio between the thickness $\phi 1$ and the thickness $\phi 3$ was 1.5.

Figure 3:
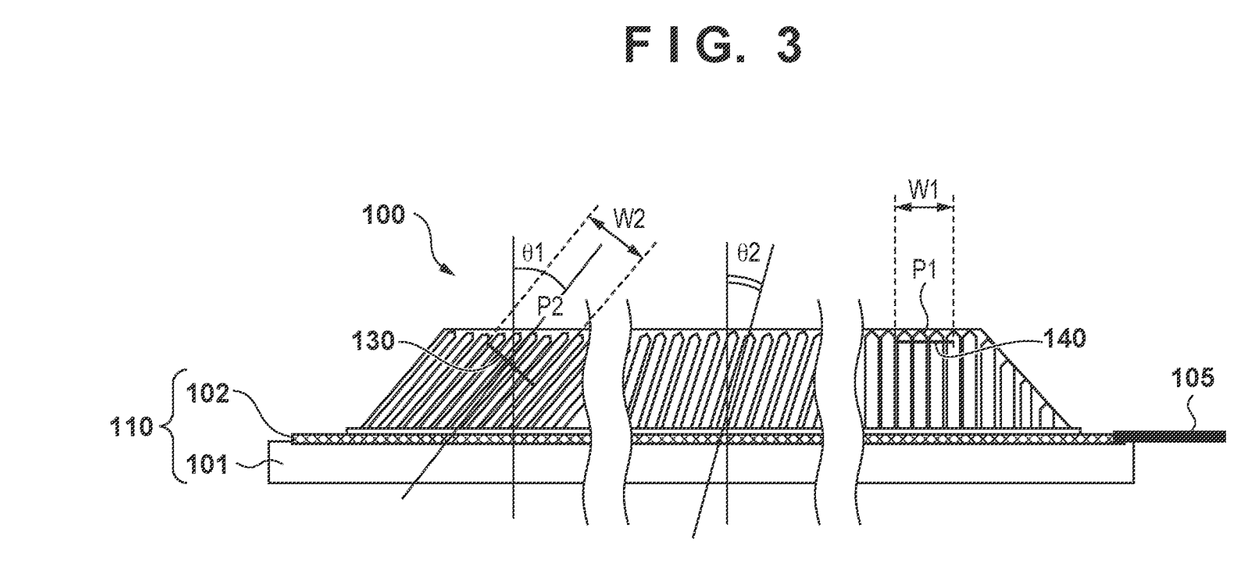
FIG. 3 is a view showing an example of the arrangement of a scintillator layer.

An example of a thickness calculation method will be described with reference to FIG. 3. FIG. 3 shows a cross section taken along line A-A' obtained by the SEM. The following is an example of calculating the thickness of the columnar crystal formed at a position P1 where the columnar crystal is formed in the normal direction and the thickness of the columnar crystal formed at a position P2 of an angle $\theta 1$ with respect to the normal direction. The thickness of the columnar crystal at the position P1 can be obtained by, for example, dividing a predetermined width W1 by the number of columnar crystals included in the predetermined width W1 including the position P1 where the columnar crystal is cut by a plane 140 parallel to the substrate at a position of about 35 μm from the distal end. The number of columnar crystals can be the number of cut columnar crystals that appear on the cut plane having predetermined width. The influence of the thicknesses of the columnar crystals on resolution is based on a relative thickness ratio. Thickness measurement may be performed by using other methods.

The reason why the thickness of each columnar crystal at a position separated from the distal end by a predetermined distance is measured is because there may be an influence of crystal growth at a position located on the end portion side of the columnar crystal. In this example, when the scintillator layer had a thickness of 500 μm, the thickness was measured at a position of 35 μm from the distal end. The thickness of each columnar crystal can be measured at a position of 5% to 20% of the thickness of the scintillator layer from the distal end on the opposite side to the proximal portion (substrate side) of the scintillator layer.

In the case of columnar crystals having tilt angles, the thickness of the columnar crystal at the position P2 can be obtained by obtaining the number of columnar crystals included in a predetermined width W2 of a cutting plane 130 perpendicular to the tilt angle and dividing the predetermined width W2 by the number of columnar crystals. A cutting position may be set within the range of about 5% to about 20% from the distal end. The predetermined widths W1 and W2 may be equal to each other and be, for example, 60 μm. However, the present invention is not limited to this. The predetermined widths W1 and W2 each can be set to a width including an appropriate number of columnar crystals. In addition, the positions P1 and P2 each can be the position of the central portion in the predetermined width.

Similar to the thicknesses, with regard to the angles formed by the directions in which the columnar crystals extend and the normal line of the main surface of the sensor panel 110, the average value of the angles of a plurality of columnar crystals included in a cutting plane within the predetermined width can be set as a tilt angle at the position P1 or P2. The directions in which the columnar crystals extend may be the directions from the central portions of the proximal portions of the columnar crystals on the sensor panel side to the central portions of the distal ends. Alternatively, the directions in which the columnar crystals extend each may be the direction of the axis of the columnar crystal or the average value of the directions of approximate straight lines obtained at three points set on a cut of a cutting plane.

After the columnar crystals were formed, the scintillator layer was covered by a protection film made of aluminum (Al), polyethylene terephthalate, or epoxy-based hot melt resin and fixed by pressure bonding at an end portion of the sensor panel 110. Thereafter, a COF was connected to the substrate by pressure bonding to complete a radiation detection apparatus. This radiation detection apparatus was irradiated with X-rays to measure the Modulation Transfer Function (MTF). The difference between a modulation transfer function MTFc at the position nearest to the rotational center and a modulation transfer function MTFp at the position farthest from the rotational center, that is, a position of 450 mm from the rotational center, was 8% or less, thus obtaining an excellent in-plane distribution of resolutions.

Example 2 of Scintillator Layer

Example 2 of a scintillator layer will be described next. In the following description of the example, a description of matters common to Example 1 described above will be omitted.

In this example, the substrate 201 having the same size as that in Example 1 was used and installed such that the horizontal distance L and the vertical distance H from the evaporation source 204 were the same as those in Example 1, and θ3=10°. Thereafter, under vacuum, the substrate 201 was rotated about the rotating shaft 203, and CsI:Tl was deposited on the substrate 201. When the film thickness reached 500 μm, the shutter 205 was closed to complete the vapor deposition.

The shapes of the formed columnar crystals were observed with the SEM. The tilt angles of column crystals were observed with respect to the normal direction of the main surface of the sensor panel 110 as follows: θ1=7° at the point nearest to the rotational center, θ2=2° at a position of 250 mm from the rotational center, and 0° at the position farthest from the rotational center, that is, a position of 450 mm from the rotational center. The thicknesses of the columnar crystals were observed as follows: φ1=4.3 μm at the point nearest to the rotational center, φ2=4.6 μm at a position of 250 mm from the rotational center, and φ3=5.0 μm at the position farthest from the rotational center, that is, a position of 450 mm from the rotational center. The ratio between the thickness φ1 and the thickness φ3 of the columnar crystals was about 1.2. Thereafter, a radiation detection apparatus was completed in the same manner as in the first embodiment. This radiation detection apparatus was then irradiated with X-rays to measure Modulation Transfer Functions (MTFs). The difference between the modulation transfer function MTFc at the position nearest to the rotational center and the modulation transfer function MTFp at the position farthest from the rotational center, that is, a position of 450 mm from the rotational center, was 10% or less, thus obtaining an excellent in-plane distribution of resolutions.

Example 3 of Scintillator Layer

Example 3 of a scintillator layer will be described next. In the following description of Example 3, a description of matters common to Examples 1 and 2 described above will be omitted.

In Example 3, the substrate 201 having the same size as that in Example 1 was installed such that the horizontal distance L and the vertical distance H from the evaporation source 204 were the same as those in the first embodiment, and θ3=20°. Thereafter, under vacuum, the substrate 201 was rotated about the rotating shaft 203, and CsI:Tl was deposited on the substrate 201. When the film thickness reached 500 μm, the shutter 205 was closed to complete the vapor deposition.

The shapes of the formed columnar crystals were observed with the SEM. The tilt angles of column crystals were observed with respect to the normal direction of the main surface of the sensor panel 110 as follows: θ1=12° at the point nearest to the rotational center, θ2=8° at a position of 250 mm from the rotational center, and 0° at the position farthest from the rotational center, that is, a position of 450 mm from the rotational center. The thicknesses of the columnar crystals were observed as follows: φ1=4.0 μm at the point nearest to the rotational center, φ2=5.5 μm at a position of 250 mm from the rotational center, and φ3=7.0 μm at the position farthest from the rotational center, that is, a position of 450 mm from the rotational center. The ratio between the thickness φ1 and the thickness φ3 of the columnar crystals was about 1.8. Thereafter, a radiation detection apparatus was completed in the same manner as Example 1. This radiation detection apparatus was then irradiated with X-rays to measure MTFs. The difference between the modulation transfer function MTFc at the position nearest to the rotational center and the modulation transfer function MTFp at the position farthest from the rotational center, that is, a position of 450 mm from the rotational center, was 15% or less, thus obtaining an excellent in-plane distribution of resolutions.

Comparative Example

A comparative example of the present invention will be described next. In the following description, a description of matters common to Examples 1 to 3 described above will be omitted, and matters different from those in Examples 1 to 3 described above will be described below.

Figure 4A:
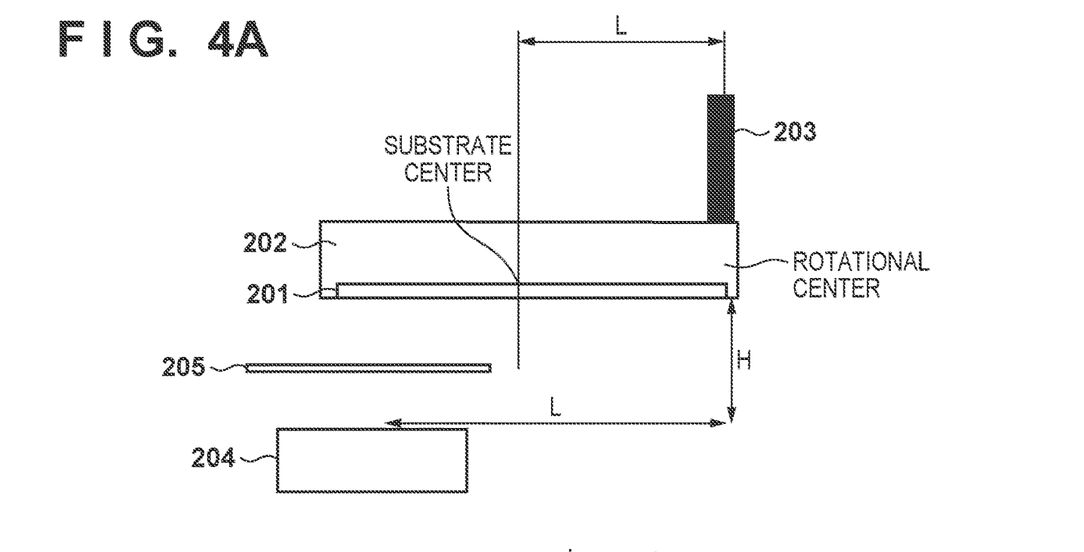
FIGS. 4A, 4B, and 4C are views showing a comparative example.
Figure 4B:
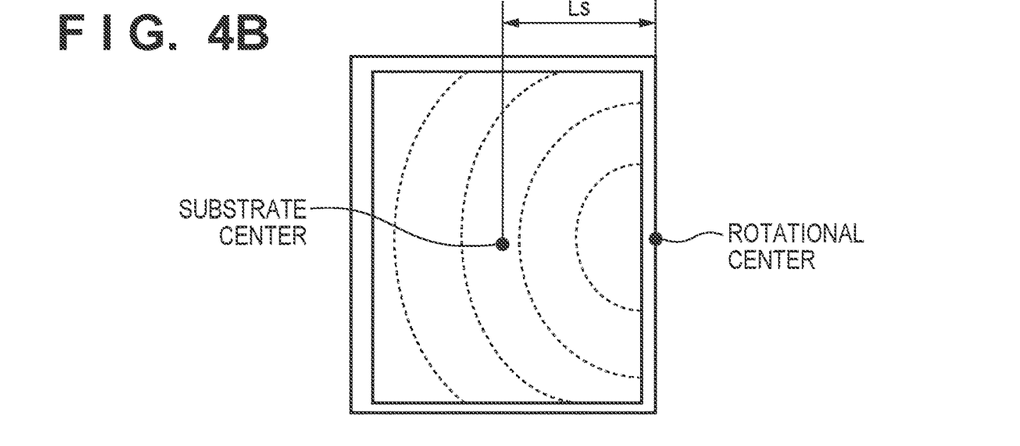
Figure 4C:
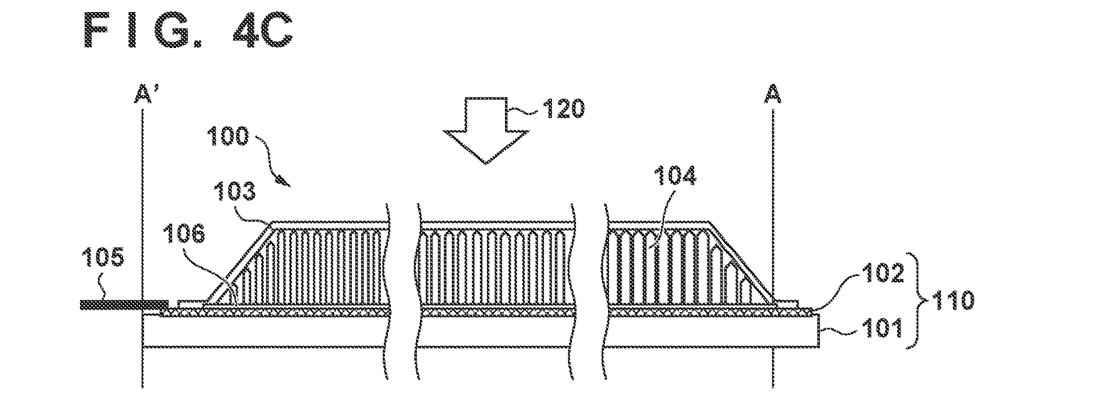

A method of forming a scintillator according to the comparative example will be described with reference to FIGS. 4A to 4C. In the comparative example, the substrate 201 having the same size as that in the first embodiment was used and installed such that the horizontal distance L and the vertical distance H from the evaporation source 204 were the same as those in the first embodiment, and θ3=0°. Thereafter, under vacuum, the substrate 201 was rotated about the rotating shaft 203, and CsI:Tl was deposited on the substrate 201. When the film thickness reached 500 μm, the shutter 205 was closed to complete the vapor deposition.

When the shapes of the formed columnar crystals were observed with the SEM, the tilt angles in all the regions were 0°, that is, the tilt angles coincide with the normal direction of the main surface of the sensor panel. The thicknesses of the columnar crystals were observed as follows: 3.5 μm at the point nearest to the rotational center, 4.3 μm at a position of 250 mm from the rotational center, and 5.5 μm at the position farthest from the rotational center, that is, a position of 450 mm from the rotational center. A radiation detection apparatus having the same arrangement as that of the first embodiment was completed, and MTFs were measured. The difference between the modulation transfer function MTFc at the position nearest to the rotational center and the modulation transfer function MTFp at a position of 450 mm from the rotational center was 20% or more.

In the comparative example, the thicknesses of the formed columnar crystals had a distribution due to the positional relationship between the evaporation source and the substrate. A radiation image changes in resolution in accordance with this thickness distribution. As shown in FIG. 4C, at the position nearest to the rotational center, the columnar crystals are thin and formed vertically to the substrate surface. Accordingly, the light generated in the columnar crystals enter the pixels located immediately below the columnar crystals with little shifts, resulting in higher modulation transfer functions than those in Examples 1 to 3. This causes a large difference between the modulation transfer function at the position nearest to the rotational center and the modulation transfer function at the position farthest from the rotational center, that is, a position of 450 mm from the rotational center, at which the columnar crystals are thick. For this reason, the in-plane distribution of resolutions may be more ununiform than that in each of the radiation detection apparatuses having the scintillator layers with the structures according to Examples 1 to 3.

Summary

The scintillator layers with the structures according to Examples 1 to 3 exhibited good resolutions when the angles formed by the directions in which the columnar crystals extend and the normal line of the main surface of the sensor panel changed in the range of 0° to 12°. With regard to the thicknesses of the columnar crystals, when the ratio between the columnar crystal thickness at the central portion of the concentric circle and the columnar crystal thickness at the peripheral portion of the concentric circle fell within the range of 1.2 to 1.8, the resolution difference was 15% or less, thus showing good results. The tilt angles of the columnar crystals may be set within the range of 0° to 15° as long as the difference between the modulation transfer function MTFc at the position nearest to the rotational center and the modulation transfer function MTFp at the position farthest from the rotational center, that is, a position of 450 mm from the rotational center is less than 20%. In addition, the ratio between the columnar crystal thickness at the central portion and the columnar crystal thickness at the peripheral portion may be 2 or less.

Second Embodiment

Figure 5:
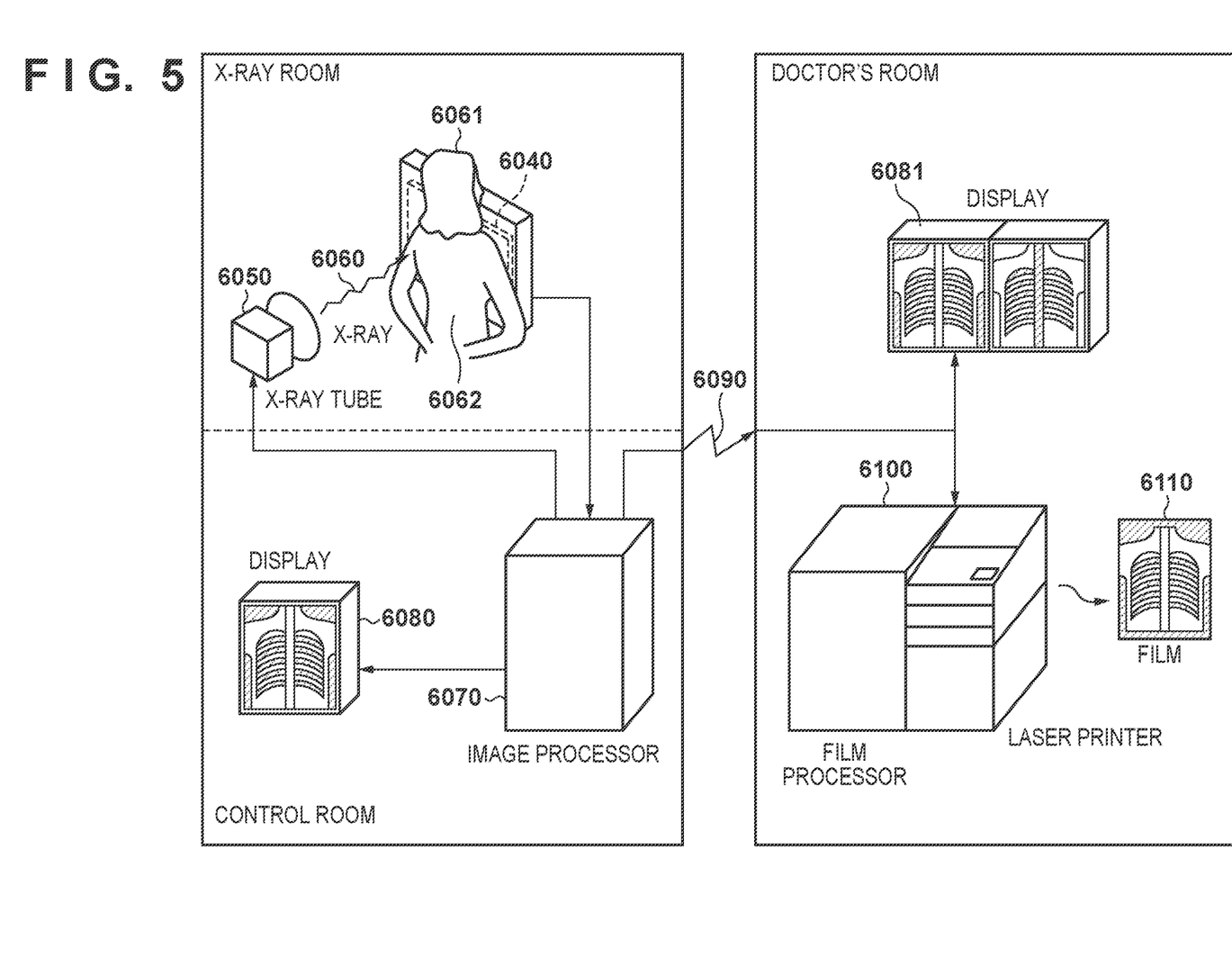
FIG. 5 is a view showing an example of the arrangement of a radiation imaging system.

A radiation imaging system according to the second embodiment of the present invention will be described next. The radiation imaging system according to this embodiment is the one to which any of the radiation detection apparatuses 100 according to Examples 1 to 3 is applied. FIG. 5 is a view showing an example of the schematic arrangement of the radiation imaging system. The following will exemplify an X-ray imaging system for so-called X-ray imaging using an X-ray 6060 as radiation 120. Note that in the present invention, the radiation 120 may include not only X-rays but also alpha-rays and beta-rays.

The X-ray 6060 generated by an X-ray tube 6050 as a radiation source passes through a chest 6062 of a patient 6061 as an imaging target and enters a radiation detection apparatus 6040. Any of the radiation detection apparatuses 100 described in the first embodiment can be applied to the radiation detection apparatus 6040. The X-ray 6060 entering the radiation detection apparatus 6040 contains internal information of the patient 6061, and a radiation image corresponding to the X-ray 6060 is obtained by the radiation detection apparatus 100. This radiation image undergoes predetermined image processing by an image processor 6070 (image processing unit) including a signal processing unit that processes an image signal. The radiation image processed by the image processor 6070 is displayed on a display 6080 in a control room to allow a user (a doctor or the like) to observe the image.

In addition, the radiation image processed by the image processor 6070 can be transferred to a doctor room in a remote place via a communication line such as a telephone line 6090 in accordance with an operation input from the user. Displaying a radiation image on a display 6081 in, for example, a doctor room, allows a user (a doctor or the like) in the doctor room to observe the radiation image. In addition, in the doctor room, the user (the doctor or the like) can record the transferred radiation image on a predetermined recording medium and can record the radiation image on a film 6110 by a film processor 6100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-180538 filed Nov. 10, 2022, which is hereby incorporated by reference herein in its entirety.

What is claimed is:

1. A radiation detection apparatus comprising:
a rectangular sensor panel having a pixel array including a plurality of photoelectric conversion elements; and
a scintillator layer on which a plurality of columnar crystals configured to convert radiation into light are arranged so as to cover the sensor panel,
wherein the scintillator layer has one side along an outer shape of the rectangular sensor panel and an opposite side of the one side and a region between the one side and the opposite side in which directions in which columnar crystals extend and a normal line of a main surface of the sensor panel form angles, and
the angles have a concentric angle distribution decreasing in angle from a central portion of the one side toward the opposite side, and thicknesses of the plurality of columnar crystals have a concentric thickness distribution increasing in thickness from the central portion of the one side to the opposite side.

2. The apparatus according to claim 1, wherein the angle distribution falls within a range of 0° to 15°.

3. The apparatus according to claim 1, wherein the direction in which the columnar crystal at the central portion of the opposite side is parallel to a normal direction of a main surface of the sensor panel.

4. The apparatus according to claim 1, wherein a ratio between an average thickness $\phi 1$ of the columnar crystals at the central portion of the one side and an average thickness $\phi 2$ of the columnar crystals at the central portion of the opposite side is $1.2 < \phi 2/\phi 1 \leq 2.0$.

5. The apparatus according to claim 1, wherein the scintillator layer scatters radiation in accordance with the angle.

6. The apparatus according to claim 1, wherein the radiation is converted into light in accordance with the thickness of the columnar crystal.

7. The apparatus according to claim 1, wherein a ratio difference between a Modulation Transfer Function (MTF) at the central portion of the one side and an MTF at the peripheral portion of the opposite side is not more than 15%.

8. The apparatus according to claim 1, wherein the plurality of photoelectric conversion elements are amorphous silicon elements.

9. A radiation imaging system comprising:
a radiation detection apparatus defined in claim 1; and
a signal processing unit configured to process a signal from the radiation detection apparatus.

* * * * *